United States Patent
Li et al.

(10) Patent No.: US 11,891,286 B2
(45) Date of Patent: Feb. 6, 2024

(54) FORKLIFT-TYPE AUTOMATED GUIDED VEHICLE

(71) Applicant: SUZHOU CASUN INTELLIGENT ROBOT CO., LTD., Suzhou (CN)

(72) Inventors: Te Li, Shenzhen (CN); Kai Wang, Shenzhen (CN)

(73) Assignee: SUZHOU CASUN INTELLIGENT ROBOT CO., LTD., Suzhou (CN)

( * ) Notice: Subject to any disclaimer, the term of this patent is extended or adjusted under 35 U.S.C. 154(b) by 833 days.

(21) Appl. No.: 17/004,034

(22) Filed: Aug. 27, 2020

(65) Prior Publication Data
US 2022/0048747 A1 Feb. 17, 2022

(30) Foreign Application Priority Data
Aug. 12, 2020 (CN) .......................... 202010806632.2

(51) Int. Cl.
*B66F 9/06* (2006.01)
*H04W 4/80* (2018.01)
(Continued)

(52) U.S. Cl.
CPC .......... *B66F 9/063* (2013.01); *B66F 9/07572* (2013.01); *B66F 9/07586* (2013.01); *B66F 9/105* (2013.01); *G05D 1/0236* (2013.01); *H04W 4/80* (2018.02); *G05D 2201/0216* (2013.01)

(58) Field of Classification Search
CPC ... B66F 9/07575; B66F 9/07586; B66F 9/063
See application file for complete search history.

(56) References Cited

U.S. PATENT DOCUMENTS

| | | | | |
|---|---|---|---|---|
| 3,047,783 A | * | 7/1962 | Bakker | A63H 30/04 318/16 |
| 2019/0315270 A1 | * | 10/2019 | Ly | B60Q 1/30 |
| 2020/0164737 A1 | * | 5/2020 | Kozlenok | G05D 1/0293 |

FOREIGN PATENT DOCUMENTS

| | | | | |
|---|---|---|---|---|
| CN | 108423084 A | * | 8/2018 | |
| CN | 109109974 A | * | 1/2019 | B66F 9/0755 |

(Continued)

OTHER PUBLICATIONS

Ge et al., Fork type AGV trolley, Jan. 15, 2019, EPO, CN 109205523 A, Machine Translation of Description (Year: 2019).*
(Continued)

*Primary Examiner* — James A English

(57) ABSTRACT

A forklift-type automated guided vehicle includes a body and a control circuit unit received in the body, both a first fork arm and a second fork arm parallel to each other and formed on a front end of the body to forklift cargo, each of the first fork arm, the second fork arm and a bottom end of the body including at least one two-wheel differential driving assembly rotatably connected to the first and second fork arms, and the body, respectively, and electrically connected to the control circuit unit. The two-wheel differential driving assembly includes a left driving wheel and a right driving wheel formed opposite to each other which can be independently driven to realize differential rotation. The present disclosure not only can forklift cargo with a small turning radius, but also can realize left-to-right sideways movements and an in-place rotation and a U-turn movement.

8 Claims, 5 Drawing Sheets

(51) Int. Cl.
*B66F 9/075* (2006.01)
*B66F 9/10* (2006.01)
*G05D 1/02* (2020.01)

(56) References Cited

FOREIGN PATENT DOCUMENTS

| | | | | |
|---|---|---|---|---|
| CN | 109205523 A | * | 1/2019 | |
| CN | 109703649 A | * | 5/2019 | ........... B62D 11/003 |
| WO | WO-2018211481 A1 | * | 11/2018 | |

OTHER PUBLICATIONS

Dai et al., Mobile robot chassis and mobile robot, Jan. 1, 2019, EPO, CN 109109974 A, Machine Translation of Description (Year: 2019).*
Han et al., A novel transmission and suspension system and a 500 kG-loaded compact AGV (automatic guided vehicle) thereof, EPO, CN 109703649 A, Machine Translation of Description (Year: 2019).*
Li et al., Omnidirectional automated guided vehicle, EPO, CN 108423084 A, Machine Translation of Description (Year: 2018).*

* cited by examiner

FORKLIFT-TYPE AUTOMATED GUIDED VEHICLE

BACKGROUND

1. Technical Field

The present disclosure generally relates to automatic guided vehicles field, and especially relates to a forklift-type automated guided vehicle.

2. Description of Related Art

An automatic guided vehicle (AGV) can be automatically driven in accordance with navigation tracks to realize unmanned transportation, which is widely used for cargo handling in workshops, warehouses and other scenarios.

Generally, such kind of AGVs includes a latent AGV, a pack-mounted AGV or a tractive AGV, etc., which can't fork goods because no forking arms are formed thereon.

So, some forklift AGVs on the market are generally driven to move by a steering wheel. However, such forklift AGV includes a pair of fork arms configured to fork goods so that an overall length of the forklift AGV is greater than other AGVs, and at the same time, this kind of forklift AGV is driven to move by a steering wheel, which will lead to its large turning radius, and fail to obtain a left-to-right sideways movement, an in-place rotation and a U-turn movement. Therefore, it's difficult to obtain transport operations in a narrow space due to result in limited movement.

Therefore, an improved forklift-type automated guided vehicle should be designed to overcome the problems above mentioned.

SUMMARY

The technical problems to be solved: in view of the shortcomings of the related art, the present disclosure relates to a forklift-type automated guided vehicle which not only can forklift cargo with a small turning radius, but also can realize left-to-right sideways movements and an in-place rotation and a U-turn movement.

The technical solution adopted for solving technical problems of the present disclosure is:

a forklift-type automated guided vehicle includes a body and a control circuit unit received in the body, both a first fork arm and a second fork arm parallel to each other and formed on a front end of the body to forklift cargo;

each of the first fork arm, the second fork arm and a bottom end of the body including at least one two-wheel differential driving assembly electrically connected to the control circuit unit;

the at least one two-wheel differential driving assembly rotatably connected to the first and second fork arms, and the body, respectively;

the at least one two-wheel differential driving assembly including a left driving wheel and a right driving wheel formed opposite to each other which can be independently driven to realize differential rotation.

Wherein the at least one two-wheel differential driving assembly includes:

a connecting base, a rotary bearing, a rotating base, a connecting frame, a left driving member, a right driving member, a left driving wheel connected to the left driving member, and a right driving wheel connected to the right driving member;

an upper end of the connecting base connected with the first fork arm, or the second fork arm, or the body, the rotary bearing positioned on a lower end of the connecting base;

an upper portion of the rotating base installed in the rotary bearing, a lower side of the rotating base fixedly connected with the upper end of the connecting base; and both the left driving member and the right driving member respectively installed on two sides of the connecting frame.

Wherein the rotating base includes a rod-shaped rotating shaft arranged on the upper portion thereof, a flange plate arranged at the lower side of the rotating base and coaxially arranged with the rotating shaft, the rotating shaft rotatably installed in the rotary bearing and the flange plate fixed with a top side of the connecting frame.

Wherein the rotating base further includes a fan-shaped limiting plate circumferentially arranged on an outer wall of the flange plate, and the connecting frame includes an inductive switch electrically connected to the control circuit unit so that the limiting plate can be rotated in or out of the inductive switch.

Wherein both the left driving member and the right driving member have a same structure and are arranged on two opposite sides of the connecting frame, each of the left and right driving members includes:

a servo motor electrically connected to the control circuit unit, a reducer connected to the connecting frame, a reduction driving mechanism arranged in the reducer;

an output end of the servo motor connected with an input of the reduction driving mechanism, and an output of the reduction driving mechanism connected with the left driving wheel or the right driving wheel; and wherein the reduction driving mechanism is a chain drive reduction mechanism or a gear drive reduction mechanism.

Wherein the rotating base further includes a circular body formed between the rotating shaft and the flange plate, a first rotary disk installed on the circular body, an encoder assembly arranged on the first fork arm or the second fork arm so as to correspond to the two-wheel differential driving assembly; and The encoder assembly including an encoder electrically connected to the control circuit unit, a fixing board arranged on a housing of the encoder, and a second rotary disk rotatably arranged on an end surface of the encoder and connected with the first rotary disk through a driving belt.

Wherein both the first fork arm and the second fork arm can be lifted up and down relative to the body along a vertical direction.

Wherein the control circuit unit includes a main control circuit, and a wireless communication circuit, a power management circuit, a battery and a driving circuit electrically connected to the main control circuit, respectively, the driving circuit configured to output a driving current to the two-wheel differential driving assembly; and the power management circuit configured to charge and discharge the battery, the wireless communication circuit configured to send and receive signals between an upper control platform and the main control circuit, and the main control circuit configured to control the driving circuit to drive the two-wheel differential driving assembly to realize differential rotation.

Wherein the wireless communication circuit includes a WIFI module, a Bluetooth module and a 5G communication module.

Wherein the body further includes a laser scanner and a signal indicator electrically connected to the control circuit unit, respectively.

Wherein the limiting is a ⅓ disk-shaped structure, ½ disk-shaped structure or ⅔ disk-shaped structure, and configured to limit a rotation angle of the two-wheel differential driving assembly rotating in a horizontal plane.

The present disclosure provides the advantages as below.

The structure of the present disclosure can provide a forklift-type automated guided vehicle including a body with both a first fork arm and a second fork arm parallel to each other and being fowled on a front end of the body, each of the first fork arm, the second fork arm and a bottom end of the body including at least one two-wheel differential driving assembly rotatably connected to the first and second fork anus and the body, respectively; and at the same time, the two-wheel differential driving assembly including a left driving wheel and a right driving wheel formed opposite to each other which can be independently driven to realize differential rotation. In this way, the left driving wheel and the right driving wheel of each two-wheel differential driving assembly can be driven as a driving wheel independently to realize its differential rotation so that the left driving wheel and the right driving wheel can rotate in a horizontal plane relative to a bottom of the forklift automatic guided vehicle, therefore, the forklift automatic guided vehicle can turn around in place and move laterally to greatly reduce its turning radius and be provided for transportation in a narrow space.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
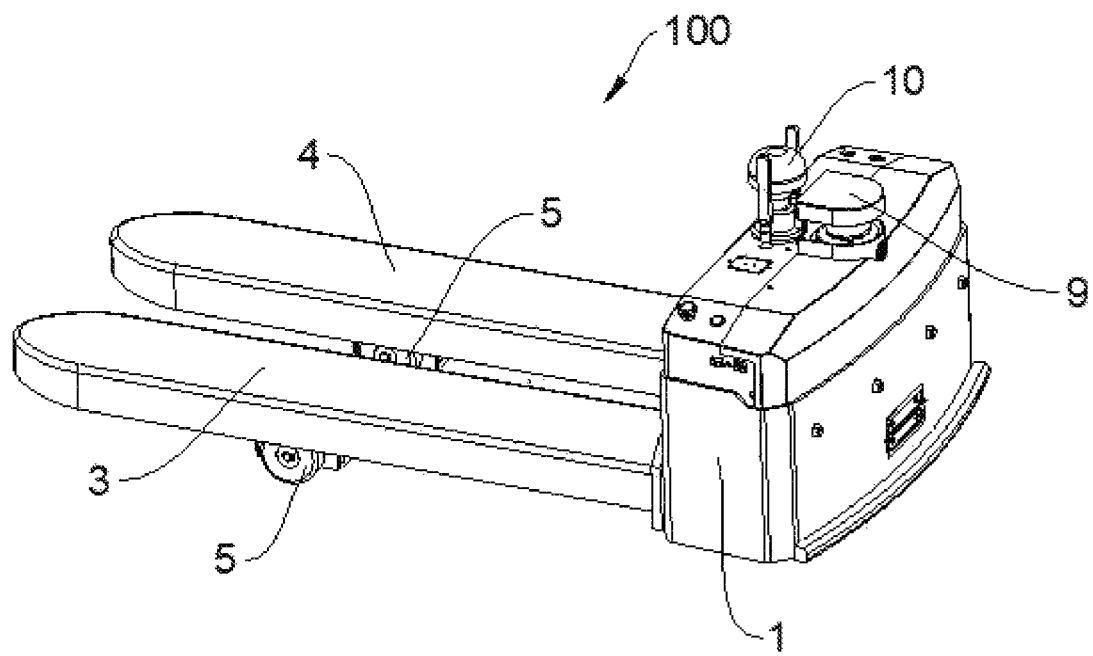
FIG. 1 is a schematic view of a forklift-type automated guided vehicle in accordance with an exemplary embodiment of the present disclosure.
Figure 2:
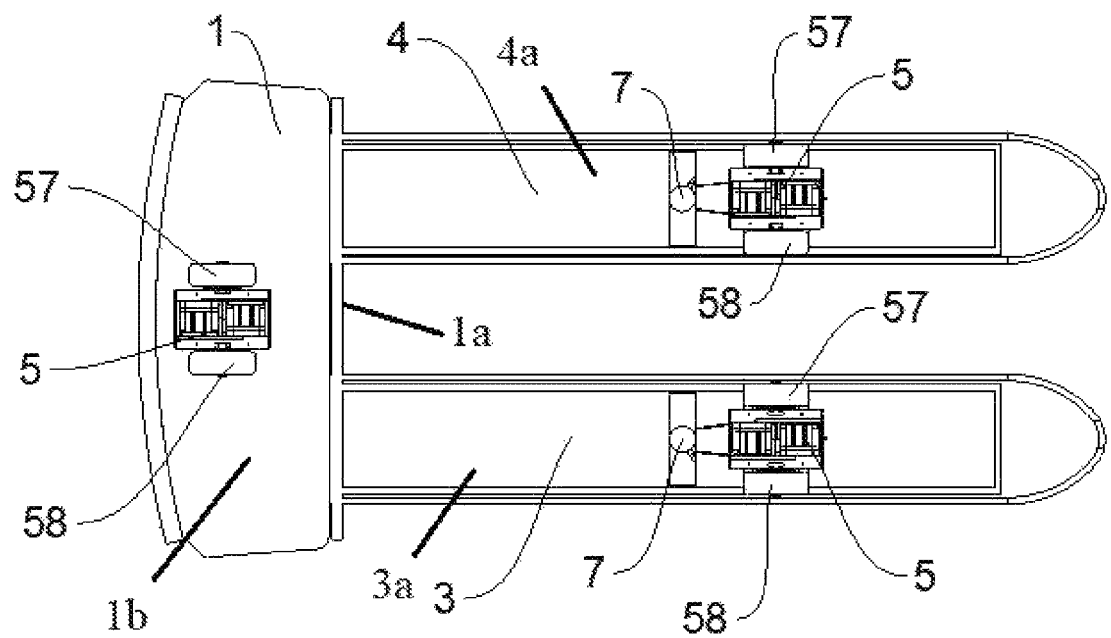
FIG. 2 is bottom schematic view of the forklift-type automated guided vehicle of FIG. 1.

The element labels according to the exemplary embodiment of the present disclosure shown as below:

forklift-type automated guided vehicle 100, body 1, front end 1a, bottom end 1b, control circuit unit 2, main control circuit 21, wireless communication circuit 22, WIFI module 22a, Bluetooth module 22b, 5G communication module 22c, power management circuit 23, battery 24, driving circuit 25, first fork arm 3, bottom portion 3a, second fork arm 4, lower portion 4a, two-wheel differential driving assembly 5, connecting base 51, upper end 51a, lower end 51b, rotary bearing 52, rotating base 53, upper portion 53a, lower side 53b, rotary shaft 531, flange plate 532, outer wall 532a, limiting plate 533, circular body 534, connecting frame 54, top side 54a, two sides 54b, left driving member 55, right driving, member 56, left driving wheel 57, right driving wheel 58, inductive switch 591, first rotary disk 592, servo motor 61, output end 61a, reducer 62, reduction driving mechanism 63, input 63a, output 63b, encoder assembly 7, encoder 71, housing 71a, end surface 71b, fixing board 72, second rotary disk 73, belt 8, laser scanner 9, signal indicator 10.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In the description of the present disclosure, it needs to be explained that all the directional indicators (such as the terms: "upper", "below", "left", "right", "front" . . . ), are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated, that the devices or elements of the present disclosure should have a particular orientation or should be designed and operated in a particular orientation. So the terms illustrated in the detail description are not by way of the limitation of the present disclosure.

In the description of the present disclosure, except where specifically otherwise illustrated or limited, the terms "connect" and "link" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Furthermore, in the description of the present disclosure, the terms such as "first" and "second" shown in the specification are only used to describe, but not indicated that the elements of the present disclosure is important or represented the amount of the elements. That is, the features limited by the terms of "first" and "second" may explicitly or implicitly include one or more features.

Referring to FIGS. 1-5, a forklift-type automated guided vehicle 100 in accordance with an embodiment of the present disclosure includes a body 1 and a control circuit unit 2 received in the body 1.

Both a first fork arm 3 and a second fork arm 4 parallel to each other and formed on a front end 1a of the body 1 for used to fork cargos so that the forklift-type automatic guided vehicle 100 can have a function of forklift cargos.

Each of the first fork arm 3, the second fork arm 4 and a bottom end 1b of the body 1 includes at least one two-wheel differential driving assembly 5 electrically connected to the control circuit unit 2.

Each of the at least one two-wheel differential driving assembly 5 is rotatably connected to the first and second fork arms 3, 4, and the body 1, respectively.

The two-wheel differential driving assembly 5 includes a left driving wheel 57 and a right driving wheel 58 formed opposite to each other which can be independently driven to realize differential rotation.

Figure 4:
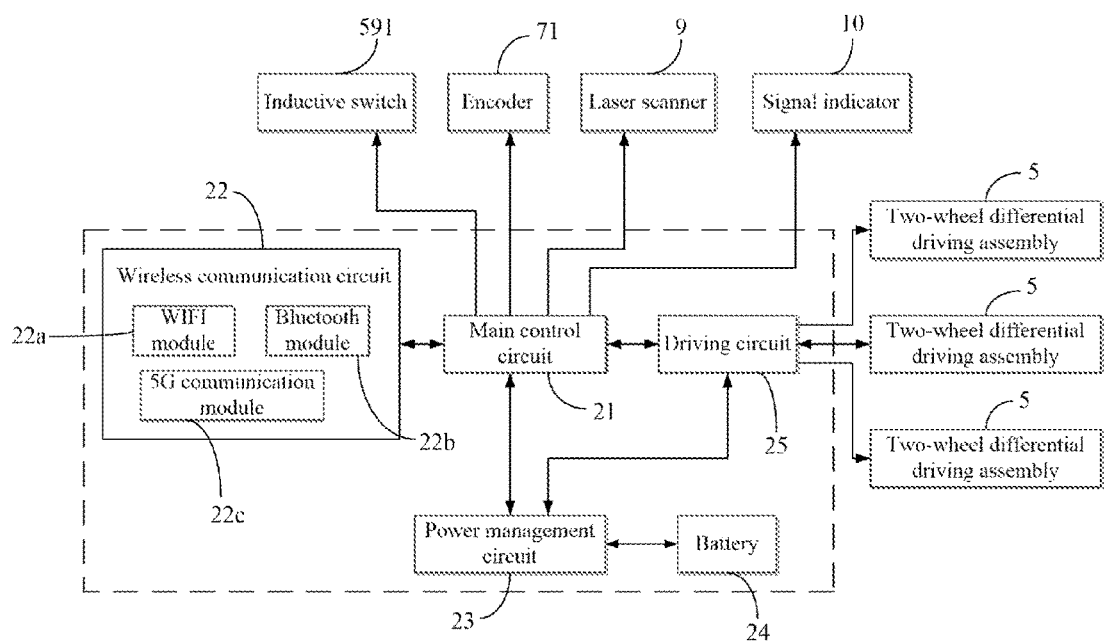
FIG. 4 is a circuit diagram of the forklift-type automated guided vehicle in accordance with a first embodiment of the present disclosure.
Figure 5:
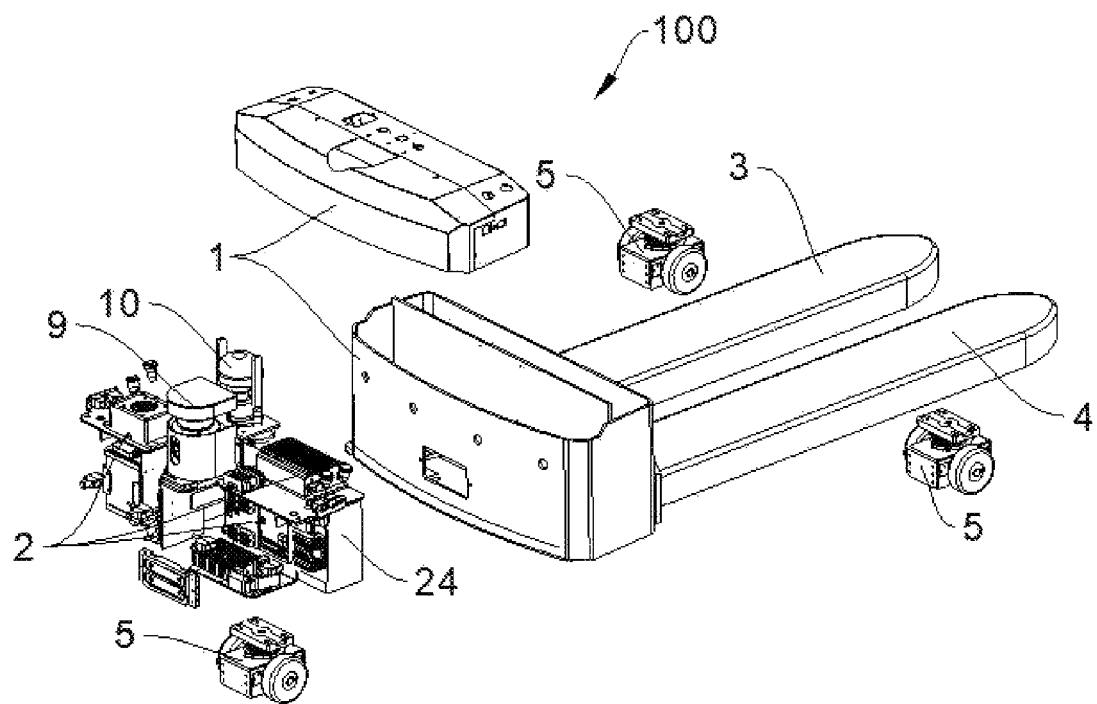
FIG. 5 is an exploded, schematic view of the forklift-type automated guided vehicle of the present disclosure.

Referring to FIG. 4 and FIG. 5, the control circuit unit 2 of the present disclosure includes a main control circuit 21, and a wireless communication circuit 22, a power management circuit 23, a battery 24 and a driving circuit 25 electrically connected to the main control circuit 21, respectively. The driving circuit 25 is configured to output a driving current to the two-wheel differential driving assembly 5.

The power management circuit 23 is configured to charge and discharge the battery 24, the wireless communication circuit 22 is configured to send and receive signals between an upper control platform and the main control circuit 21, and the main control circuit 21 is configured to control the driving circuit 25 to drive the two-wheel differential driving assembly 5 to realize differential rotation. In an embodiment of the present disclosure, the battery 24 is a lithium ion battery with a voltage and current specification of 48V/24 Ah.

The control circuit unit 2 is configured to receive wireless signals from the upper control platform such as a control center through the wireless communication circuit 22 and then the wireless signals are processed by the main control circuit 21 to obtain navigation tracks. And then, the driving circuit 25 is configured to drive the left driving wheel 57 and the right driving wheel 58 of the two-wheel differential driving assembly 5 to move forward and backward according to the navigations tracks and timely feed real-time position information of the forklift-type automatic guided vehicle 100 back to the upper control platform.

Preferably, the wireless communication circuit 22 includes a WIFI module 22a, a Bluetooth module 22b and a 5G communication module 22c so that a wireless communication connection can be made between the upper control platform and a variety of wireless networks.

Figure 3:
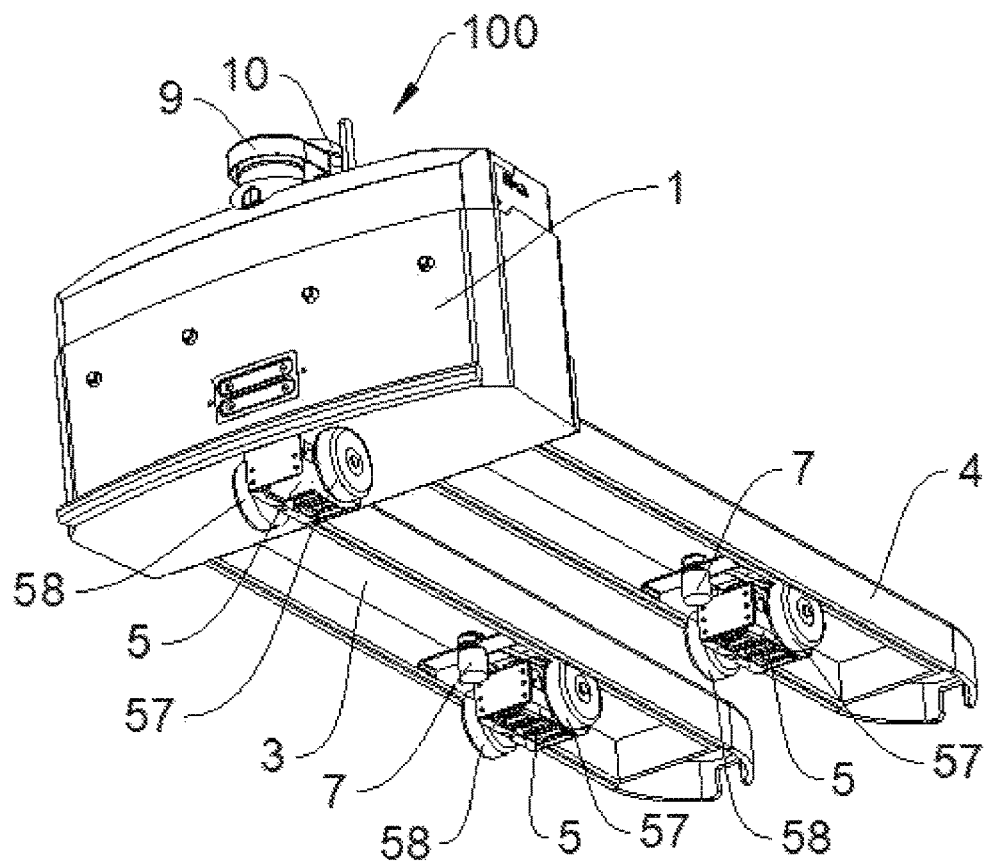
FIG. 3 is similar to FIG. 1, but shown from another view.

As an embodiment of the present disclosure, referring to FIG. 3 and FIG. 4, each of the first fork arm 3, the second fork arm 4 and the bottom end 1b of the body 1 includes the two-wheel differential driving assembly 5, in this way, there are three two-wheel differential driving assemblies 5 to form a triangular support point at the bottom of the forklift-type automated guided vehicle 100 to ensure a stability thereof. At the same time, because each of the two-wheel differential driving assemblies 5 connected with the first fork arm 3, the second fork arm 4 and the body 1 can rotate relative to the bottom of the forklift-type automated guided vehicle 100 in the horizontal plane, that is, the two-wheel differential driving assembly 5 formed at a bottom portion 3a of the first fork arm 3 can rotate in the horizontal plane relative to the first fork arm 3, so do the two-wheel differential driving assembly 5 formed at a lower portion 4a of the second fork arm 4 and the two-wheel differential driving assembly 5 formed at the bottom end 1b of the body 1. In this way, the forklift automatic guided vehicle 100 of the present disclosure can turn around in place and move laterally to greatly reduce its turning radius and be provided for transportation in a narrow space.

The forklift-type automatic guided vehicle 100 can turn around in place and move laterally by providing the left driving wheel 57 and the right driving wheel 58 arranged on each of the two-wheel differential driving assemblies 5 to be independently driven to realize differential rotation. Because the left driving wheel 57 and the right driving wheel 58 can be independently driven as a main driving wheel. In this way, differential motion can be realized by providing different rotational speeds of the left driving wheel 57 and the right driving wheel 58. For example, in order to realize a left lateral movement of the forklift-type automatic guided vehicle 100, the left driving wheels 57 of the three two-wheel differential driving assemblies 5 does not move, while, all the right driving wheels 58 of the three two-wheel differential driving assemblies 5 rotate clockwise simultaneously, so as to drive all the three two-wheel differential driving assemblies 5 to rotate 90 degrees in the horizontal plane relative to the bottom of the forklift-type automatic guided vehicle 100, and then, the left driving wheels 57 and the right driving wheels 58 of the three two-wheel differential driving assemblies 5 are driven simultaneously to rotate clockwise simultaneously. In this way, the three two-wheel differential driving assemblies 5 can simultaneously drive the body 1, the first fork arm 3 and the second fork arm 4 to horizontally move towards the left. The in-place rotation of the forklift-type automatic guided vehicle 100 can also be realized by independently driving the left driving wheel 57 and the right driving wheel 58 of each of the two-wheel differential driving assemblies 5 to form a differential speed therebetween.

In this way, the forklift-type automatic guided vehicle 100 of the present disclosure can not only has a function of forking cargos, but also has an automatic navigation and transportation function of an AGV, at the same time, it can realize left-to-right sideways movements and an in-place rotation and a U-turn movement to greatly reduce its turning radius and save a transportation operation space, which is very suitable for cargo transportation in a narrow space.

Preferably, both the first fork arm 3 and the second fork arm 4 of the present disclosure can be lifted up and down relative to the body 1 along a vertical direction, which can quickly and conveniently and automatically load and unload goods by taking advantage of a difference in heights. The present disclosure can set a lifting mechanism on the two-wheel differential driving assembly 5 to lift the first fork arm 3 and the second fork arm 4.

The body 1 of the present disclosure includes a laser scanner 9 and a signal indicator 10 electrically connected to the control circuit unit 2, respectively. Thus, the forklift-type automatic guided vehicle 100 of the present disclosure can ensure safety range verification and signal prompt during a transport operation so as to ensure the safety of automatic transportation of goods.

It can be understood that the body 1 further includes a display screen and an interactive operation panel electrically connected to the control circuit unit 2. The display screen can be an LED, an LCD or a touch-controlled display screen.

Figure 6:
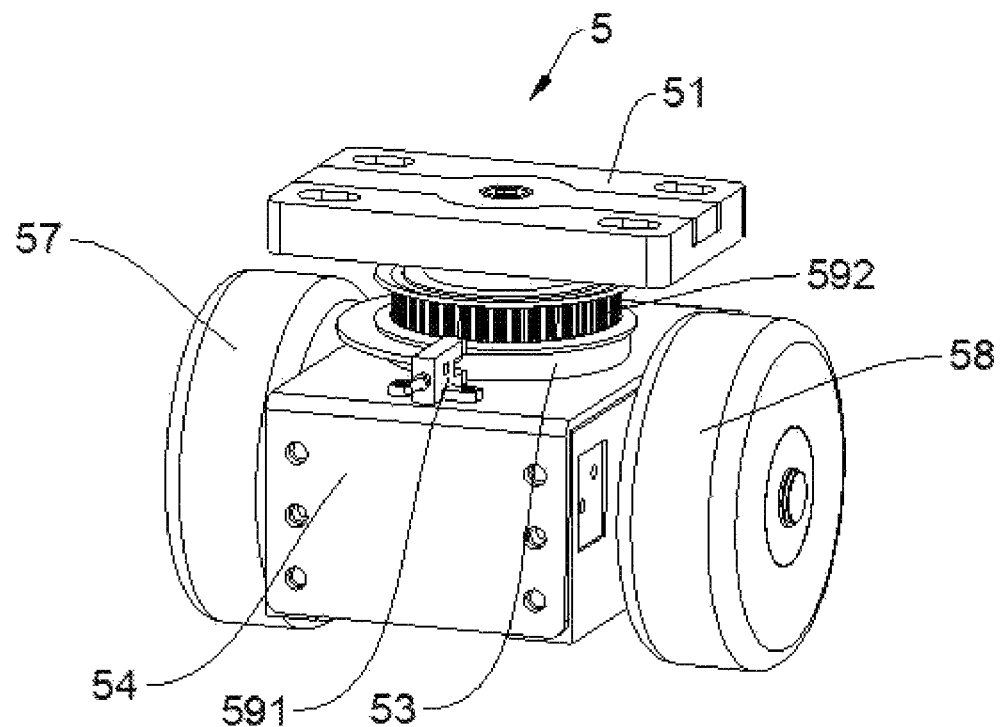
FIG. 6 is a schematic view of a two-wheel differential driving assembly of the forklift-type automated guided vehicle of the present disclosure.
Figure 7:
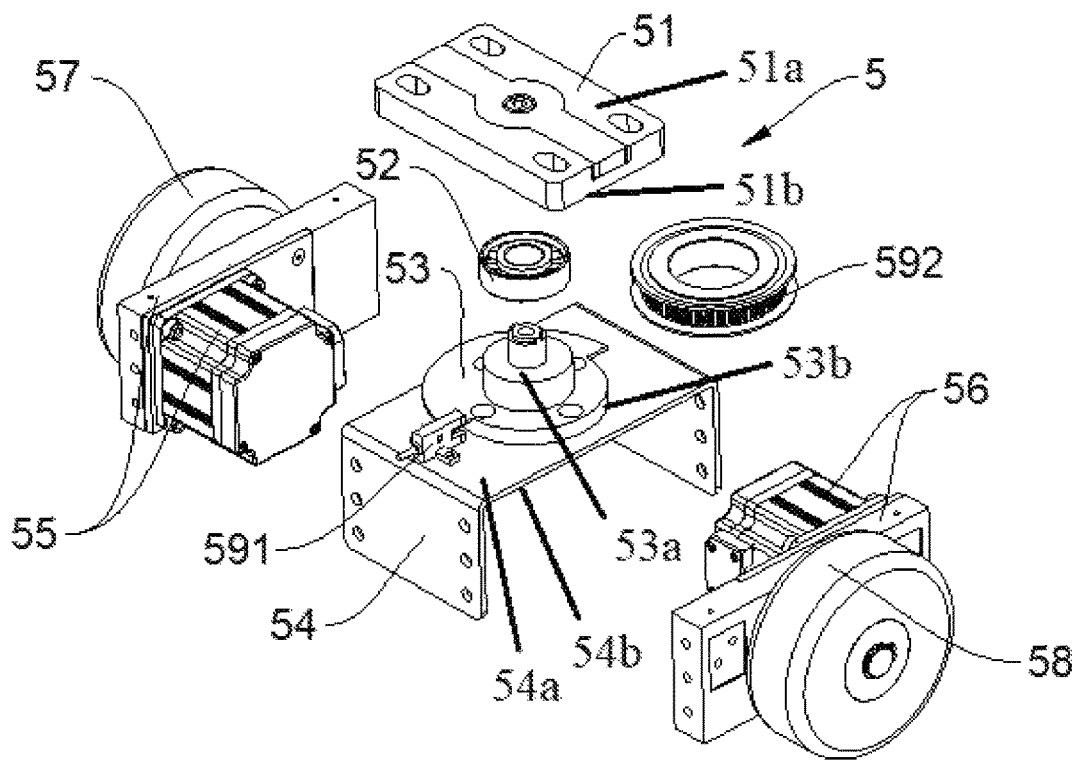
FIG. 7 is an exploded, schematic view of the two-wheel differential driving assembly of the forklift-type automated guided vehicle of the present disclosure.

Specifically, referring to FIG. 6 and FIG. 7, in the forklift-type automatic guided vehicle 100 of the present disclosure, each two-wheel differential driving assembly 5 includes:

a connecting base 51, a rotary bearing 52, a rotating base 53, a connecting frame 54, a left driving member 55, a right driving member 56, the left driving wheel 57 and the right driving wheel 58;

an upper end 51a of the connecting base 51 connected with the first fork arm 3, or the second fork arm 4, or the body 1, and the rotary bearing 52 positioned on a lower end 51b of the connecting base 51 so that the whole two-wheel differential driving assembly 5 can be installed on the first fork arm 3, or the second fork arm 4, or the body 1 by the connecting base 51;

an upper portion 53a of the rotating base 53 installed in the rotary bearing 52, a lower side 53b of the rotating base 53 fixedly connected with the upper end 51a of the connecting base 51 so that the rotating base 53 can rotate in the horizontal plane relative to the connecting base 51;

both the left driving member 57 and the right driving member 58 respectively installed on two sides 54b of the connecting frame 54; the connecting frame 54 is a U-shaped configuration so as to fix the left driving member 55, the right driving member 56 with the rotating base 53 together;

the left driving wheel 57 connected to the left driving member 55, and the right driving wheel 58 connected to the right driving member 56.

So, the left driving member 55 is configured to drive the left driving wheel 57 to roll on the ground, and the right driving member 56 is configured to drive the right driving wheel 58 to roll on the ground. The left driving member 55 and the right driving member 56 are respectively connected to the control circuit unit 2 and separately controlled by the control circuit unit 2. When a rotation speed of the left driving wheel 57 driven by the left driving member 55 is different from that of the right driving wheel 58 driven by the right driving member 56 to form a difference speed therebetween, so that different forces applied on the two sides 54b of the connecting frame 54 by the difference speed can cause the forklift-type automated guided vehicle 100 to rotate in the horizontal plane. The connecting frame 54 is rotated to drive the rotating base 53 to rotate within the rotating bearing 52, while the connecting base 51 is remained stationary, thereby components positioned below the connecting base 51 of the two-wheel differential driving assembly 5 can also be driven to rotate in the horizontal plane.

Figure 8:
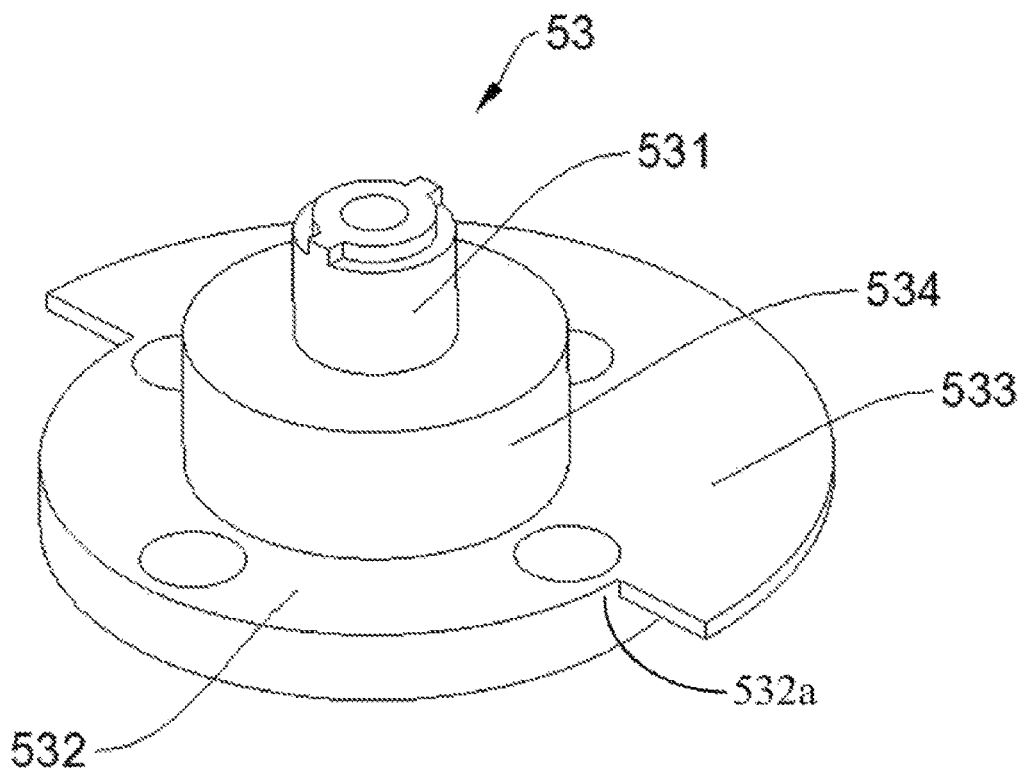
FIG. 8 is a schematic view of a rotating base of the two-wheel differential driving assembly of FIG. 7.

Referring to FIG. 8, the rotating base 53 includes a rod-shaped rotating shaft 531 arranged on the upper portion 53a thereof, a flange plate 532 arranged at the lower side 53b of the rotating base 53 and coaxially arranged with the rotating shaft 531, the rotating shaft 531 rotatably installed in the rotary bearing 52 and the flange plate 532 fixed with a top side 54a of the connecting frame 54. The flange plate 532 is provided for conveniently connecting the connecting frame 54 and the rotating shaft 531 can be rotatably connected with the rotating bearing 52.

Preferably, referring to FIG. 7 and FIG. 8, the rotating base 53 further includes a fan-shaped limiting plate 533 circumferentially arranged on an outer wall 532a of the flange plate 532, and the connecting frame 54 includes an inductive switch 591 electrically connected to the control circuit unit 2 so that the limiting plate 533 can be rotated in or out of the inductive switch 591. The limiting plate 533 is a ⅓ disk-shaped structure, ½ disk-shaped structure or ⅔ disk-shaped structure, and configured to limit a rotation angle of the two-wheel differential driving assembly 5 rotating in the horizontal plane, thereby the rotation angle of the two-wheel differential driving assembly 5 in the horizontal plane can be avoided without being limited to control.

Figure 9:
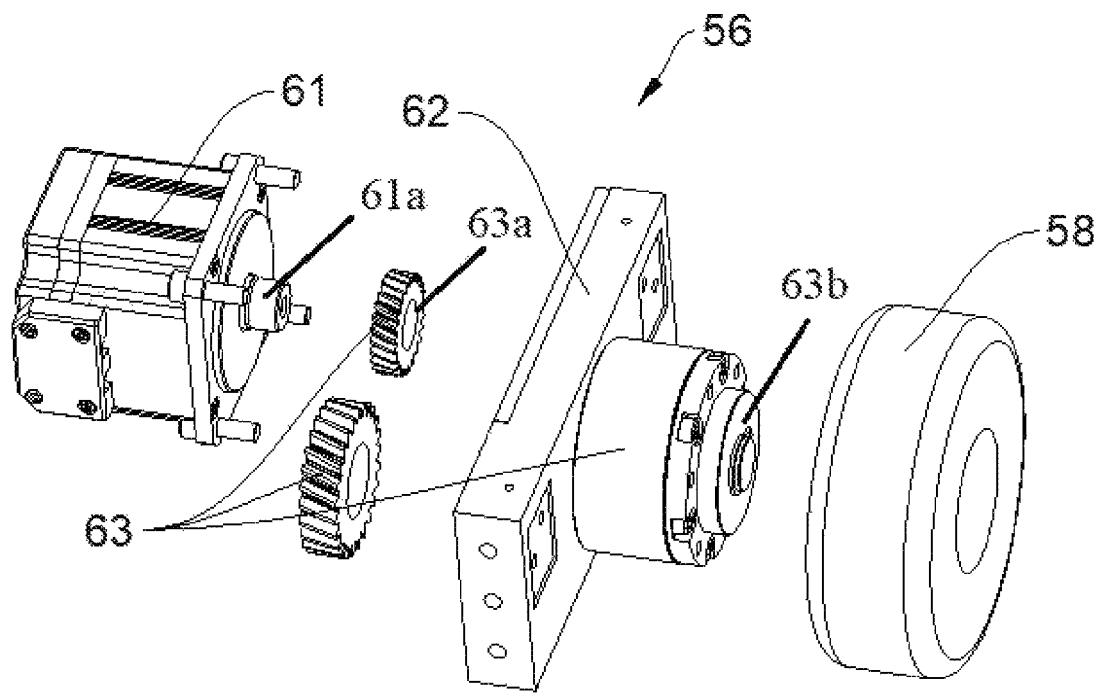
FIG. 9 is an exploded schematic view of a right driving member and a right driving wheel of the two-wheel differential driving assembly of FIG. 7.

FIG. 9 is a schematic view of the right driving member 56. Both the left driving member 55 and the right driving member 56 have a same structure and are arranged on two opposite sides 54b of the connecting frame 54, each of the left and right driving members 55, 56 includes: a servo motor 61 electrically connected to the control circuit unit 2, a reducer 62, and a reduction driving mechanism 63 arranged in the reducer 62. Specifically, the servo motor 61 is electrically connected to the driving circuit 25 of the control circuit unit 2. The servo motor 61 combined with the control circuit unit 2 can be configured to accurately control a rotation speed and a rotation direction of the left driving wheel 57 or the right driving wheel 58, so as to accurately control the movement of the whole forklift-type automated guided vehicle 100.

An output end 61a of the servo motor 61 is connected with an input 63a of the reduction driving mechanism 63, and an output 63b of the reduction driving mechanism 63 is connected with the left driving wheel 57 or the right driving wheel 58, and the reducer 62 is fixed with the connecting frame 54. Front and back ends of the reducer 62 are fixed with the connecting frame 54.

The reduction driving mechanism 63 is a chain drive reduction mechanism or a gear drive reduction mechanism. In an embodiment of the present disclosure, the reduction driving mechanism 63 is a gear drive reduction mechanism and provided for reducing the speed of the servo motor 61 output to the left driving wheel 57 or the right driving wheel 58 so as to increase a torque and a carrying capacity of the forklift-type automated guided vehicle 100.

Figure 10:
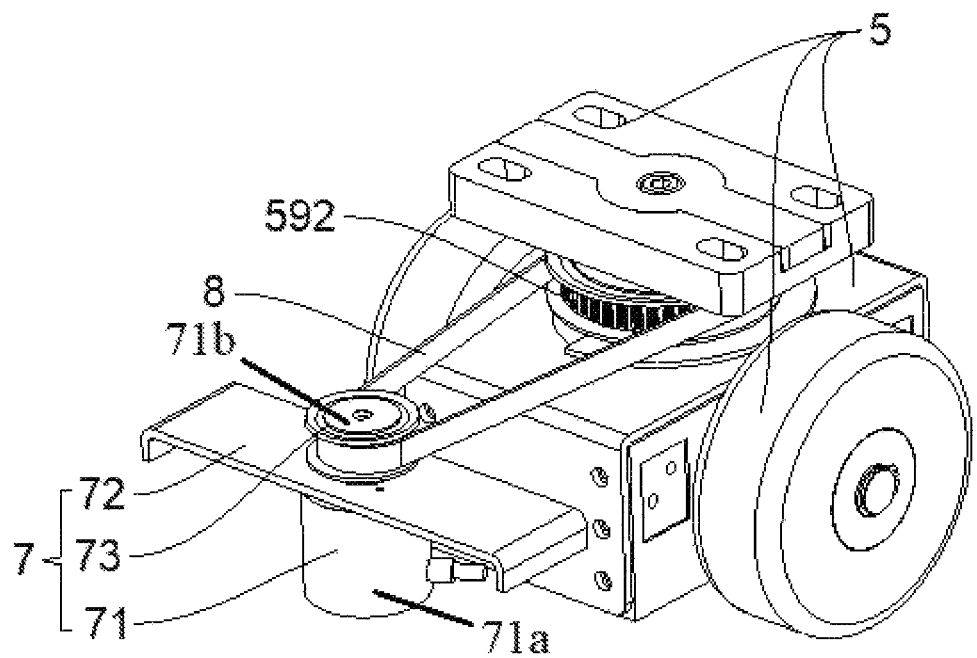
FIG. 10 is an assembly schematic view of the two-wheel differential driving assembly and an encoder assembly of FIG. 6.

Preferably, referring to FIG. 8 and FIG. 10, the rotating base 53 of the present disclosure further includes a circular body 534 formed between the rotating shaft 531 and the flange plate 532, a first rotary disk 592 installed on the circular body 534, an encoder assembly 7 arranged on the first fork arm 3 or the second fork arm 4 so as to correspond to the two-wheel differential driving assembly 5.

The encoder assembly 7 includes an encoder 71 electrically connected to the control circuit unit 2, a fixing board 72 arranged on a housing 71a of the encoder 71, and a second rotary disk 73 rotatable arranged on an end surface 71b of the encoder 71 and connected with the first rotary disk 592 through a driving belt 8.

The encoder 71 is fixed on the first fork arm 3 or the second fork arm 4 or the body 1 via the fixing board 72, a rotary shaft is connected with the end surface 71b of the encoder 71 so as to further connect the encoder 71 with the second rotary disk 73 for rotating the second rotary disk 73. Because the rotating base 53 can be rotated in the horizontal plane under the differential speed between the left driving wheel 57 and the right driving wheel 58 so that the first rotary disk 592 can rotate by following rotation of the rotating base 53, and then, the second rotary disk 73 can be driven to rotate together with the first rotary disk 592 through the driving belt 8. In this way, the encoder 71 can be configured to detect a rotation angle of the second rotary disk 73 and then further detect the rotation angle of the whole two-wheel differential driving assembly 5 in the horizontal plane, thus, the rotation angle of the two-wheel differential driving assembly 5 can be further accurately controlled in order to adopt to the movement control such as a steering movement, a lateral movement and an oblique movement in different sites and spaces.

Furthermore, the body 1 of the present disclosure can also provide with the encoder assembly 7 at a position adjacent to the two-wheel differential driving assembly 5, so that a rotation angle of the two wheel differential driving assembly 5 formed on the body 1 can be accurately controlled. In this way, combined with the encoder assemblies 7 on the first fork arm 3 and the second fork arm 4, the three two-wheel differential driving assemblies 5 can be accurately rotation control to further improve steering performance of the forklift-type automated guided vehicle 100 in the horizontal plane.

The forklift-type automatic guided vehicle 100 of the present disclosure can provide a body 1 with both a first fork arm 3 and a second fork arm 4 parallel to each other and being formed on the front end 1a of the body 1, each of the first fork arm 3, the second fork arm 4 and the bottom end 1b of the body 1 including at least one two-wheel differential driving assembly 5 rotatably connected to the first and second fork arms 3, 4, and the body 1, respectively; and at the same time, the two-wheel differential driving assembly 5 including a left driving wheel 57 and a right driving wheel 58 formed opposite to each other which can be independently driven to realize differential rotation. In this way, the left driving wheel 57 and the right driving wheel 58 can be independently controlled as a driving wheel so that the left driving wheel 57 and the right driving wheel 58 of each two-wheel differential driving assembly 5 can rotate in the horizontal plane relative to the bottom of the forklift-type automatic guided vehicle 100 under their differential rotation. Therefore, the forklift-type automatic guided vehicle 100 can turn around in place and move laterally to greatly reduce its turning radius and be provided for transportation in a narrow space.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A forklift-type automated guided vehicle comprising:
a body;
a control circuit unit received in the body; and
a first fork arm and a second fork arm parallel to each other and formed on a front end of the body to forklift cargos;
wherein each of the first fork arm, the second fork arm and a bottom end of the body comprising at least one two-wheel differential driving assembly electrically connected to the control circuit unit, and rotatably connected to the first fork arm, the second fork arm and the body, respectively;
the at least one two-wheel differential driving assembly comprises a left driving wheel and a right driving wheel formed opposite to each other which can be independently driven to realize differential rotation;
wherein the at least one two-wheel differential driving assembly comprises a connecting base, a rotary bearing, a rotating base, a connecting frame, a left driving member, a right driving member, a left driving wheel connected to the left driving member, and a right driving wheel connected to the right driving member;
an upper end of the connecting base connected with the first fork arm, or the second fork arm, or the body, the rotary bearing positioned on a lower end of the connecting base;
an upper portion of the rotating base installed in the rotary bearing, a lower side of the rotating base fixedly connected with the upper end of the connecting base;
both the left driving member and the right driving member respectively installed on two sides of the connecting frame;
wherein the rotating base comprises a rod-shaped rotating shaft arranged on the upper portion thereof, a flange plate arranged at the lower side of the rotating base and coaxially arranged with the rotating shaft, the rotating shaft rotatably installed in the rotary bearing and the flange plate fixed with a top side of the connecting frame; and
the rotating base further comprises a fan-shaped limiting plate circumferentially arranged on an outer wall of the flange plate, and the connecting frame comprises an inductive switch electrically connected to the control circuit unit so that the limiting plate can be rotated in or out of the inductive switch.

2. The forklift-type automated guided vehicle as claimed in claim 1, wherein both the left driving member and the right driving member have a same structure and are arranged on two opposite sides of the connecting frame, each of the left and right driving members comprises:
a servo motor electrically connected to the control circuit unit, a reducer connected to the connecting frame, a reduction driving mechanism arranged in the reducer;
an output end of the servo motor connected with an input of the reduction driving mechanism, and an output of the reduction driving mechanism connected with the left driving wheel or the right driving wheel; and wherein
the reduction driving mechanism is a chain drive reduction mechanism or a gear drive reduction mechanism.

3. The forklift-type automated guided vehicle as claimed in claim 1, wherein the rotating base further comprises a circular body formed between the rotating shaft and the flange plate, a first rotary disk installed on the circular body, an encoder assembly arranged on the first fork arm or the second fork arm so as to correspond to the two-wheel differential driving assembly; and
the encoder assembly comprising an encoder electrically connected to the control circuit unit, a fixing board arranged on a housing of the encoder, and a second rotary disk rotatably arranged on an end surface of the encoder and connected with the first rotary disk through a driving belt.

4. The forklift-type automated guided vehicle as claimed in claim 1, wherein both the first fork arm and the second fork arm can be lifted up and down relative to the body along a vertical direction.

5. The forklift-type automated guided vehicle as claimed in claim 1, wherein the control circuit unit comprises a main control circuit, and a wireless communication circuit, a power management circuit, a battery and a driving circuit electrically connected to the main control circuit, respectively, the driving circuit configured to output a driving current to the two-wheel differential driving assembly; and
the power management circuit configured to charge and discharge the battery, the wireless communication circuit configured to send and receive signals between an upper control platform and the main control circuit, and the main control circuit configured to control the driving circuit to drive the two-wheel differential driving assembly to realize differential rotation.

6. The forklift-type automated guided vehicle as claimed in claim 5, wherein the wireless communication circuit comprises a WIFI module, a Bluetooth module and a 5G communication module.

7. The forklift-type automated guided vehicle as claimed in claim 1, wherein the body further comprises a laser scanner and a signal indicator electrically connected to the control circuit unit, respectively.

8. The forklift-type automated guided vehicle as claimed in claim 1, wherein the limiting plate is a 1/3 disk-shaped structure, 1/2 disk-shaped structure or 2/3 disk-shaped structure, and configured to limit a rotation angle of the two-wheel differential driving assembly rotating in a horizontal plane.

\* \* \* \* \*